United States Patent Office 2,858,216
Patented Oct. 28, 1958

2,858,216

STABILIZED MALT BEVERAGE

Mortimer W. Brenner, Hartsdale, N. Y., assignor to Brewing Industries Research Institute, Chicago, Ill., a corporation of Illinois No Drawing. Application October 11, 1956
Serial No. 615,236

1 Claim. (Cl. 99—48)

This invention describes carbonated malt beverages of superior stability and methods for producing them.

In my U. S. Patent No. 2,763,554, issued September 18, 1956, it was disclosed that the presence of compounds of oxalic acid, particularly calcium oxalate in metastable equilibrium, is responsible for an unstable condition in carbonated malt beverages, such as beers and ales, known commonly as "overfoaming," or "gushing," or "wild beer." This condition has, in the past, occurred in malt beverages of varied origin in an unpredictable fashion, particularly in bottles or cans, and frequently has an adverse effect on consumer acceptance. Up to the time of the disclosure in my patent mentioned above, the etiology of gushing was poorly understood, and consequently, there were no adequate means available to brewers to assure control or elimination of this undesirable characteristic which might afflict their products from time to time.

As conducive to a clear understanding of this invention it should be noted that the metastable system from which oxalates precipitate in insoluble form after the beverage has been sealed in the consumer package, is complex; probably involving interactions between oxalate and the larger molecular structures present, such as proteins, peptides, polysaccharides and other carbohydrate fractions; pectins or tannins, as well as certain cations in addition to calcium. As nearly all of the cereal products and the hops used as raw materials for manufacture of malt beverages contain oxalates in significant quantities, it will be understood that the finished beverages normally contain varying amounts of oxalate. Therefore, no malt beverage made by procedures known and used in the art prior to this disclosure and my prior invention can be said to have been free of oxalate and to have been knowledgeably protected against the tendency to "gush."

Generally speaking, carbonated malt beverages prepared by normal brewing practice will contain, when packaged, from 8 to 20 p. p. m. of oxalate ion, if not specially treated in accordance with my patent.

The methods described herein are intended substantially to preclude the gushing tendency by complexing the oxalate ion and/or the calcium ion, thereby holding either of these ions in soluble complex form so that later precipitation of calcium oxalate is inhibited.

I have found that the addition of soluble salts of several metals to beer which has been through normal processing and in which the precipitation of calcium oxalate has come to metastable equilibrium inhibits further precipitation of insoluble oxalate. Among the metallic ions which accomplish this effect, probably by forming co-ordinate or complex compounds with oxalate ion, are magnesium, aluminum, chromium, and nickel. Since chromium and nickel are not desirable additives in food products, magnesium and aluminum are preferred by virtue of their non-toxicity.

The normal content of magnesium in representative American beers has been found to be between 50 and 120 p. p. m., while the normal content of aluminum is appreciably lower. In carrying out tests on the stabilizing effect of additions of magnesium and aluminum, it has been found that the addition of as little as 50 p. p. m. may exert a beneficial effect and that quantities as high as 2000 p. p. m. may not adversely influence the character of the product, while improving the stability.

The preferred range of treatment lies between 50 and 400 p. p. m. of added magnesium and/or aluminum.

The addition may be made through the use of any soluble salt of either magnesium and/or aluminum provided the anion is not toxic and that any undesired influence on the pH of the product is compensated for by treatment with either acid or alkali, as required.

For example, magnesium chloride is a desirable salt for use in such treatment, though it has a tendency to be acidic by hydrolysis and may displace the pH of the treated beer significantly. In such event, the required amount of suitable alkali is added to the treating solution of magnesium chloride or to the beer so that the pH of the treated product is not significantly shifted by the process.

As a combination of the foregoing discovery with that covered in another application by me covering the treatment of beer with cation exchange resins, I have discovered that the treatment of beer with a cation exchange resin in the magnesium form enhances the stability and resistance of the treated beer to gushing and development of insolubles and turbidity, and is desirable in that the calcium which is removed from the product is replaced by magnesium which is favorable to the stability of the product and is non-toxic.

I have discovered that the use of non-toxic complexing or sequestering agents capable of binding or sequestering calcium ion at the pH of beer in competition with oxalic acid or oxalate ion enhances the stability of beer and its resistance to gushing. Materials of this type which are suitable for use in this process are phytic acid, and/or its non-toxic salts and kojic acid and/or its non-toxic soluble salts.

When beer is treated with between 100 and 2000 p. p. m. of phytic acid, phytate salt, or kojic acid or kojate salt, enhanced stability results.

These treatments may be carried out at any stage of the brewing process, but preferably in ruh or storage after as much of the calcium oxalate which may precipitate normally has formed. Under such conditions, the treatment may be somewhat simpler and the amount of material required may be somewhat lessened.

It should be noted that inhibition of the propensity of carbonated malt beverages to precipitate insoluble oxalate in the package may involve not only the development of a tendency for the malt beverage to overfoam when the package is opened, but may also cause less in clarity or increase in haziness which is undesirable for consumer acceptance. A product which has improved stability toward overfoaming therefore tends to have improved shelf life and consumer acceptance, even though it is known that there are other causes for the development of haze or turbidity, not related to overfoaming or gushing.

While the foregoing specification is believed fully to set forth the invention, a few specific examples follow in order to assure compliance with statutory requirements.

Example 1

While beer is being transferred from the fermentor to the primary storage tank (the ruh tank), it is treated with 10 lbs. of magnesium chloride per 100 barrels of beer, which would introduce approximately 100 parts of magnesium ion per million parts of beer.

Example 2

As the beer is transferred from primary storage to secondary storage, it is commonly filtered through a diatomaceous earth filter. Illustratively, the beer coming from the discharge of the diatomaceous earth filter is passed through a bed of cation exchange resin which has been converted to the magnesium form by regenerating with a strong solution of magnesium chloride or magnesium sulfate. In this instance, Dowex-50, a styrene-divinyl-benzene type resin, is used, though many other cation exchange resins in magnesium form might have been used. The resin bed of this ion exchange resin is capable of removing substantially all of the calcium normally present in the beer provided the flow rate is not excessive and provided the total exchange capacity of the bed is not exceeded. For beer with average calcium content, one cubic foot of resin is capable of treating approximately 50 to 200 barrels of beer before regeneration is required. By this process, the magnesium content of the beer is enhanced by an amount equivalent to the concentration of calcium ion present in the beer before passage through the magnesium-form resin.

Example 3

As the beer is pumped to the fermentor, it is treated with a solution of phytic acid and sodium phytate in proportions required to give a pH of between about 4.0 and about 4.6. The rate of treatment is sufficient to introduce approximately 400 p. p. m. of phytate. The fermentation proceeds normally and the finishing procedures are continued as usual.

What is claimed as new is:

In a method of preventing the gushing of packaged beer, the step which comprises admixing the beer, prior to packaging the same, with up to 2000 parts per million of a nontoxic compound selected from the group consisting of kojic acid and water-soluble non-toxic salts of kojic acid, and maintaining the pH of the beer at substantially its normal value, and then packaging the resulting treated beer.

References Cited in the file of this patent
UNITED STATES PATENTS

| | | |
|---|---|---|
| 2,239,543 | Andrews et al. | Apr. 22, 1941 |
| 2,310,383 | Andrews et al. | Feb. 9, 1943 |
| 2,322,880 | Pollak | June 29, 1943 |
| 2,548,594 | Edmonds | Apr. 10, 1951 |
| 2,667,417 | Delmousee et al. | Jan. 26, 1954 |
| 2,711,963 | Gray | June 28, 1955 |
| 2,745,747 | Hennig | May 15, 1956 |
| 2,748,002 | Kneen | May 29, 1956 |
| 2,763,554 | Brenner | Sept. 18, 1956 |